(12) United States Patent
Backer et al.

(10) Patent No.: US 10,400,114 B2
(45) Date of Patent: *Sep. 3, 2019

(54) IONIC STRENGTH TRIGGERED DISINTEGRATION OF FILMS AND PARTICULATES

(71) Applicant: ROHM AND HAAS COMPANY, Philadelphia, PA (US)

(72) Inventors: Scott Backer, Philadelphia, PA (US); Afia S. Karikari, Bristol, PA (US); Paul Mercando, Pennsburg, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/024,016

(22) PCT Filed: Sep. 25, 2014

(86) PCT No.: PCT/US2014/057436
§ 371 (c)(1),
(2) Date: Mar. 22, 2016

(87) PCT Pub. No.: WO2015/048274
PCT Pub. Date: Apr. 2, 2015

(65) Prior Publication Data
US 2016/0244619 A1    Aug. 25, 2016

Related U.S. Application Data

(60) Provisional application No. 61/883,618, filed on Sep. 27, 2013.

(51) Int. Cl.
| C09D 5/16 | (2006.01) |
| C08K 3/22 | (2006.01) |
| C09D 123/08 | (2006.01) |
| C08L 33/02 | (2006.01) |

(52) U.S. Cl.
CPC ............ *C09D 5/1662* (2013.01); *C08K 3/22* (2013.01); *C08L 33/02* (2013.01); *C09D 5/1606* (2013.01); *C09D 5/1618* (2013.01); *C09D 5/1668* (2013.01); *C09D 123/0876* (2013.01); *C08K 2003/2248* (2013.01)

(58) Field of Classification Search
None
See application file for complete search history.

(56) References Cited

U.S. PATENT DOCUMENTS

| 3,267,083 | A | 8/1966 | Imhof |
| 3,355,319 | A | 11/1967 | Rees |
| 3,472,825 | A | 10/1969 | Walter |
| 4,692,494 | A | 9/1987 | Sonenstein |
| 6,162,852 | A | 12/2000 | Honeycutt |
| 6,166,117 | A | 12/2000 | Miyazaki |
| 6,482,517 | B1 | 11/2002 | Anderson |
| 6,660,704 | B1 | 12/2003 | Waschenbach |
| 6,727,216 | B1 | 4/2004 | Waschenbach |
| 7,022,656 | B2 | 4/2006 | Verrall |
| 7,745,517 | B2 | 6/2010 | Vicari |
| 2002/0081930 | A1 | 6/2002 | Jackson |
| 2002/0098326 | A1 | 7/2002 | Sato |
| 2003/0096910 | A1 | 5/2003 | Soerens |
| 2003/0158072 | A1 | 8/2003 | Goodson |
| 2003/0220042 | A1 | 11/2003 | Lostocco |
| 2004/0110891 | A1 | 6/2004 | Guo |
| 2006/0258553 | A1 | 11/2006 | Catalfamo |
| 2007/0142542 | A1 | 6/2007 | Morris |
| 2009/0155335 | A1* | 6/2009 | O'Shaughnessey .... A61L 15/46 424/423 |
| 2009/0298712 | A1 | 12/2009 | Kiryukhin |
| 2011/0206632 | A1 | 8/2011 | Kappock |
| 2012/0024348 | A1 | 2/2012 | Prejean |
| 2012/0108491 | A1 | 5/2012 | Simonsen |
| 2013/0065811 | A1 | 3/2013 | Fernandez-Prieto |

FOREIGN PATENT DOCUMENTS

| CA | 2416464 | | 7/2003 |
| CA | 2475921 | A1 | 8/2003 |
| CA | 2651361 | A1 | 1/2008 |
| CA | 2405736 | A1 | 11/2011 |
| EP | 0 561 342 | A1 * | 9/1993 |
| EP | 0558188 | A1 | 9/1993 |
| EP | 1386959 | A1 | 2/2002 |
| EP | 1234854 | A1 | 8/2002 |
| EP | 1331262 | A1 | 7/2003 |
| EP | 1364610 | A1 | 11/2003 |
| EP | 1384771 | A1 | 1/2004 |
| EP | 1428867 | B1 | 8/2007 |
| EP | 1958991 | A2 | 8/2008 |
| EP | 2135933 | A1 | 12/2009 |
| EP | 2392543 | A1 | 12/2011 |
| EP | 2399978 | A1 | 12/2011 |

(Continued)

OTHER PUBLICATIONS

K.T. Chong et al., "Polyethylene-co-acrylic Acid as Coating for Biosensor Application: A Quartz Crystal Microbalance Study," 2002, Langmuir, 18: 9932-9936.

(Continued)

*Primary Examiner* — Patricia Duffy
*Assistant Examiner* — Garen Gotfredson
(74) *Attorney, Agent, or Firm* — McDonnell Boehnen Hulbert & Berghoff LLP

(57) ABSTRACT

A composition comprising an ethylene (meth)acrylic acid copolymer and an anti-fouling agent is provided. The composition selectively disintegrates in media of different ionic strengths. Also provided is a method of preventing fouling using the composition.

20 Claims, No Drawings

(56) References Cited

FOREIGN PATENT DOCUMENTS

| GB | 1291019 A | 9/1972 |
|---|---|---|
| GB | 2375542 A | 11/2002 |
| GB | 2387602 A | 10/2003 |
| JP | 03-179063 | 8/1991 |
| JP | 2004-091779 | 3/2004 |
| JP | 2004-143295 | 5/2004 |
| JP | 2007-224234 | 9/2007 |
| MX | PA03011211 A | 8/2004 |
| WO | WO1989010117 A1 | 11/1989 |
| WO | WO1997000275 A2 | 1/1997 |
| WO | WO2000006505 A1 | 2/2000 |
| WO | WO2000038751 A1 | 7/2000 |
| WO | WO2001034939 A1 | 5/2001 |
| WO | WO2001083867 A2 | 11/2001 |
| WO | WO2002017888 A2 | 3/2002 |
| WO | WO2002042342 A2 | 5/2002 |
| WO | WO2002079270 A2 | 10/2002 |
| WO | WO2002092751 A2 | 11/2002 |
| WO | WO2003016455 A1 | 2/2003 |
| WO | WO2004046299 A1 | 6/2003 |
| WO | WO2004046300 A1 | 6/2004 |
| WO | WO2005028603 A1 | 3/2005 |
| WO | WO2009135098 A1 | 11/2009 |
| WO | WO2010003934 A1 | 1/2010 |
| WO | WO2010015493 A1 | 2/2010 |
| WO | WO2010024348 A1 | 3/2010 |
| WO | WO2012083478 A1 | 6/2010 |

OTHER PUBLICATIONS

K. Koschorreck et al., "Improving the functional expression of a Bacillus licheniformis laccase by random and site-directed mutagenesis," 2009, BMC Biotechnology, 9:12.
A.M. Mayer et al., "Laccase: new functions for an old enzyme," 2002, Phytochemistry, 60:551-565.
X. Su et al., "Enzyme immobilization on poly(ethylene-co-acrylic acid) films studied by quartz crystal microbalance with dissipation monitoring," 2005, J Colloid Interf Sci, 287:35-42.
C.F. Thurston, "The structure and function of fungal laccases," 1994, Microbiology, 140:19-26.
P. Zhang et al., "Rapid SLT Gene Detection on Polyethylene—Coacrylic Acid Film without Molecular Labels or Surface-Fouling Agents," 2000, Anal. Biochem., 282:218-226.
PCT/US2014/057436, International Search Report and Written Opinion, dated Dec. 8, 2014.
PCT/US2014/057436, Notification of Transmittal of the International Preliminary Report on Patentability, dated Nov. 5, 2015.
PCT/US2014/057422, Written Opinion and International Search Report, dated Oct. 30, 2014.
PCT/US2014/057422, International Preliminary Report on Patentability and Written Opinion, dated Mar. 29, 2016.
PCT/US2014/057441, International Search Report and Written Opinion, dated Jan. 15, 2015.
PCT/US2014/067087, International Search Report and Written Opinion, dated May 6, 2015.
PCT/US2014/067087, International Search Report and Written Opinion, dated May 31, 2016.
PCT/US2014/057441, International Preliminary Report on Patentability and Written Opinion, dated Mar. 29, 2016.
Translation of Japanese Office Action for JP Patent Application No. 2016-545227 dated May 22, 2018, pp. 1-5.

* cited by examiner

IONIC STRENGTH TRIGGERED DISINTEGRATION OF FILMS AND PARTICULATES

CROSS REFERENCE TO RELATED APPLICATIONS

This application claims priority to International Patent Application No. PCT/US2014/057436, filed Sep. 25, 2014, which claims priority to U.S. Provisional Application No. 61/883,618, filed Sep. 27, 2013, all of which are hereby incorporated herein by reference in their entireties.

FIELD

This disclosure relates to compositions that selectively disintegrate in media of different ionic strengths.

BACKGROUND

There are multiple conditions where protection of a material or surface in high ionic strength systems would be advantageous. For example, within the home care market, brand owners have moved to more concentrated delivery systems, such as high efficiency concentrated laundry detergents and unit dose products. In these cases, the products as sold are significantly higher in ionic strength than during use. Another area in which a composition is exposed to high ionic strength media is in marine coatings. Thus, there is a need for compositions that do not dissolve in high ionic strength media.

BRIEF SUMMARY

In one aspect, a composition is provided, comprising an ethylene (meth)acrylic acid copolymer, wherein at least a portion of the carboxylic acid groups in the (meth)acrylic acid component are neutralized and an anti-fouling agent.

In another aspect, a film composition is provided, comprising an ethylene (meth)acrylic acid copolymer and an anti-fouling agent, wherein at least a portion of the carboxylic acid groups in the (meth)acrylic acid component are neutralized, and wherein the ratio of the ethylene component to the (meth)acrylic acid component is about between about 50:50 to 90:10.

In yet another aspect, a coated article is provided, comprising an article, a coating composition comprising an ethylene (meth)acrylic acid copolymer, wherein at least a portion of the carboxylic acid groups in the (meth)acrylic acid component are neutralized and an anti-fouling agent. The coating composition does not disintegrate in a high ionic strength media, and disintegrates in a low ionic strength media.

DETAILED DESCRIPTION

The present disclosure relates to a chemical composition of an ethylene (meth)acrylic acid copolymer. As used herein, the term "composition" may mean, for example, a mixture, solution, or dispersion. "(Meth)acrylic," as used herein, means acrylic, methacrylic, or mixtures thereof. Ethylene (meth)acrylic acid (EAA) copolymers can be used in a wide variety of applications including high-performance adhesives, flexible packaging films, pouches, and extrusion coating and extrusion lamination applications. The free acid form of ethylene (meth)acrylic acid copolymers can be neutralized to the desired degree with a suitable base. Ethylene (meth)acrylic acid copolymers can be obtained with varying water dispersibility depending on the degree of neutralization. For example, complete water dispersibility, or under certain conditions, complete water solubility, is obtained when the (meth)acrylic acid moiety is completely neutralized with a stoichiometric amount of base whereas partially neutralized EAA copolymers can be water dispersible, water sensitive, or water insensitive depending on the application for which it is aimed.

The copolymer may be used in various compositions, for example, liquid compositions or film compositions. Such a film could also be physically reduced in size via grinding or other means to provide an encapsulated active ingredient with higher surface area. Similarly sized particles can also be produced from a liquid composition by methods known in the art, such as spray-drying and lyophilization. The composition may comprise a copolymer composition or may comprise a composition and one or more additional materials to provide application specific physical properties (tensile strength, durability, adhesion, etc.). The additional materials may include crosslinking agents, plasticizer agents, disintegrating agents, and/or surfactants.

The crosslinking agent may include, for example, $Ca^{2+}$, $Mg^{2+}$, $Al^{3+}$ or $Zn^{2+}$. In addition to the crosslinking agent, the composition may include at least one additional additive, such as a plasticizing agent, a disintegrating agent, and/or a surfactant. The plasticizing agent may be a hydrophobic plasticizer, a hydrophilic plasticizer, or a combination thereof. For example, the plasticizing agent may be benzyl alcohol, UCON® LB-65 (a polyalkylene glycol (PAG)-based synthetic water insoluble lubricant) T-BEP (tris(butoxyethyl) phosphate, an alkyl phosphate film forming aid and plasticizer), among others. The disintegrating agent may be, for example, acrylic acid, PVOH, a starch, cellulose, or a second co-polymer. The surfactant may be, for example, an anionic surfactant, a non-ionic surfactant, an amphoteric surfactant, or mixtures thereof. Examples of anionic surfactants include those known in the art, such as DOWFAX® 2A1 (alkyldiphenyloxide disulfonate), ammonium lauryl sulfate, sodium lauryl sulfate, sodium laureth sulfate. Examples of non-ionic surfactants include those known in the art, such as polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, and sorbitan alkyl esters. Examples of amphoteric surfactants include those known in the art, such as Ammonyx® LO (lauramine oxide).

This composition does not disintegrate in a variety of media in which the ionic strength is very high caustic, household bleach, seawater, synthetic seawater). The term "disintegrate," as used herein, means dissolve, disperse, or to be soluble. The media may be in the form of for example, a solution, a slurry, a dispersion, or a paste. The media may also be substantially free of substantial amounts of inorganic salts, but the media may include organic amine salts to provide the required ionic strength and alkalinity, Examples of such organic amine salts include mono-, di-, or -substituted alkylamine salts of carboxylic acid and fatty acid esters. High ionic strength media is media with a salt content of greater than about 3 percent, more preferably greater than about 7 percent. Upon exposure to low ionic strength aqueous media (e.g., deionized water, standard tap water, the wash liquid of a laundry machine) the e will break up within minutes, becoming dispersed within the low ionic strength media with gentle agitation. Low ionic strength media is media with a salt content of about 0 to about 2 percent (e.g., tap water, dionized water).

In marine applications, such as on boats or ships, the salinity of seawater provides the ionic strength required to prevent dissolution or disintegration of the composition, thus, the composition can be used as the basis of a coating, which once applied, can be removed after use via fresh water, i.e., low ionic strength, washing. In addition, the composition may be formulated in such a way that it contains an additive capable of acting as an anti-fouling agent.

Biofouling or biological fouling is the accumulation of microorganisms, plants, algae, or animals on wetted surfaces. Anti-fouling is the process of removing or preventing these accumulations. Examples of anti-fouling agents include, but are not limited to, biocides such as organotin compounds (e.g., the tributylitin moiety (TBT)) and copper compounds (e.g., copper oxide) and coatings based on organic polymers. Coatings based on organic polymers may be hydrophobic, such as those based on fluoropolymers and silicone, or hydrophilic, such as those based on highly hydrated zwitterions (e.g., glycine betaine and sulfobetaine).

The present composition could be used in any application where it is desirable to prevent growth or fouling, such as in water towers, on docks, on metal dam components, on oil rigs, and on ship hulls.

In particular embodiments, the composition may comprise an ethylene (meth)acrylic acid copolymer and an anti-fouling agent. At least a portion of the carboxylic acid groups in the (meth)acrylic acid component are neutralized with a base, resulting in a salt. For example, the carboxylic acid groups may be neutralized with a sodium cation to fort sodium salt. In another embodiment, the carboxylic acid groups may be neutralized with a potassium cation to form a potassium salt. The degree of neutralization may be between about 70 percent and about 100 percent, preferably between about 90 percent and about 100 percent, and more preferably between about 98 percent and about 100 percent. In other embodiments, the degree of neutralization may be between about 70 percent and about 95 percent, preferably between about 85 percent and about 95 percent, more preferably between about 90 percent and about 95 percent. A portion or all of the remaining (meth)acrylic acid may be ionically crosslinked. Increasing the degree of neutralization increases the dispersibility of the composition in low ionic strength media. Those skilled in the art recognize appropriate methods for determining degrees of neutralization. See, e.g., U.S. Pat. No. 3,472,825.

The composition may also comprise water, such that it forms a liquid composition, which may be applied to an article or may be dried to create, for example, a film or particles. In some embodiments, the composition may comprise about 60 to about 80 weight percent water. The ethylene (meth)acrylic acid copolymer may be present in a dispersion, which may be formed any number of methods known to those of skill in the art. The weight ratio of the ethylene to (meth)acrylic acid in the copolymer may be between about 50:50 and about 90:10, preferably between about 70:30 and about 90:10, and more preferably between about 75:25 and about 80:20.

The composition may be used to produce a coated article, for example, a coated ship, dock, or dam. The coated article may comprise the article, the composition comprising an ethylene (meth)acrylic acid copolymer, and the anti-fouling agent.

Also disclosed are methods of preventing growth or fouling. In such methods, the present composition is applied to an article and prevents the accumulation of microorganisms, plants, algae, or animals on the surface of the article.

EXAMPLES

Example 1

The functionalized polyolefin composition used for this example is a mixture of ethylene (meth)acrylic acid (80 weight percent ethylene and 20 weight percent (meth)acrylic acid) neutralized with potassium hydroxide. The degree of neutralization is 92 percent. The composition be prepared using procedures known in the art. See, e.g., U.S. Patent Application No. 2011/0319521; PCT Published Application No. WO2011034883; and PCT Published Application No. WO2012082624. The composition has a pH of 10 and a Brookfield viscosity of 500 (Brookfield RVT, #2 spindle, 20 RPM, 25° C.) and is hereinafter referred to as EAA-K.

To the composition of EAA-K (6.6 g, 23% active), 1.3 g of a suspension of copper oxide (46% in water) is added. The material is agitated via manual shaking of the vial to fully suspend the copper particles in the composition. A film is solution cast on glass using a 203 μm (8 mils) draw down bar, followed by drying in a 40 degrees Celsius oven for 1 hour. The film is removed from the glass and shown to be a freestanding film. Five samples of the film (approximately 2 cm×2 cm) are submerged in room temperature deionized water, tap water, synthetic seawater, saturated NaCl solution, and saturated KCl solution, respectively. The vial is inverted in order to achieve agitation.

In the high ionic strength systems (synthetic seawater, saturated NaCl solution, and saturated KCl solution) the films appear to remain intact, and no color change to the supernatant is observed. This suggests a low level of leaching of film components into the water during the experiment. In the low ionic strength media (deionized water and tap water), the films break apart within five minutes, and the supernatant is observed to have turned brown after allowing the solids to settle. This suggests high levels of leaching of the film during the experiment.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the arm to which this invention pertains and which fall within the limits of the following claims.

What is claimed is:

1. A composition comprising:
   a copolymer consisting of units derived from ethylene and units derived from (meth)acrylic acid, wherein at least about 85% of the carboxylic acid groups in the (meth)acrylic acid-derived units are neutralized, wherein the weight ratio of the ethylene-derived units to (meth)acrylic acid-derived units in the copolymer is between about 75:25 and about 80:20; and
   an anti-fouling agent.

2. The composition of claim 1, further comprising water.

3. The composition of claim 1, wherein the ethylene (meth)acrylic acid copolymer is present in a dispersion.

4. The composition of claim 1, wherein the degree of neutralization is between about 90% and about 95%.

5. The composition of claim 1, comprising between about 60 percent and about 80 percent water.

6. The composition of claim 1, wherein the anti-fouling agent is copper oxide.

7. The composition of claim 1, wherein the anti-fouling agent is a hydrophobic coating.

8. The composition of claim 1, wherein the anti-fouling agent is a hydrophilic coating.

9. A film composition, comprising:
   a copolymer, wherein the copolymer consists of units derived from ethylene and units derived from (meth) acrylic acid, at least about 85% of the carboxylic acid groups in the (meth)acrylic acid-derived units are neutralized, and
      wherein the weight ratio of the ethylene-derived units to the (meth)acrylic acid-derived units is about between about 75:25 and about 80:20;
   and an anti-fouling agent.

10. The film composition of claim 9, further comprising at least one additive, wherein the additive is a plasticizing agent, a crosslinking agent, a disintegrating agent, and/or a surfactant.

11. The film composition of claim 9, wherein the anti-fouling agent is selected from the group consisting of biocides, hydrophobic coatings, and hydrophilic coatings.

12. A coated article comprising
   a coating composition comprising:
      a copolymer, wherein the copolymer consists of units derived from ethylene and units derived from (meth) acrylic acid, at least about 85% of the carboxylic acid groups in the (meth)acrylic acid-derived units are neutralized,
      wherein the weight ratio of the ethylene-derived units to (meth)acrylic acid-derived units in the copolymer is between about 75:25 and about 80:20;
   and an anti-fouling agent.

13. A composition according to claim 4, wherein the at least a portion of the carboxylic acid groups in the (meth) acrylic acid-derived units are neutralized with a sodium cation or potassium cation.

14. A film composition according to claim 9, wherein the at least a portion of the carboxylic acid groups in the (meth)acrylic acid-derived units are neutralized with a sodium cation or potassium cation.

15. A coated article according to claim 12, wherein the at least a portion of the carboxylic acid groups in the (meth) acrylic acid-derived units are neutralized with a sodium cation or potassium cation.

16. A composition according to claim 1, wherein the degree of neutralization is between about 90% and about 100%.

17. A composition according to claim 1, wherein the degree of neutralization is between about 98% and about 100%.

18. A film composition according to claim 9, wherein the degree of neutralization is between about 85% and about 95%.

19. A coated article according to claim 12, wherein the degree of neutralization is between about 90% and about 95%.

20. A coated article according to claim 12, wherein the degree of neutralization is about 92%.

* * * * *